US012602405B2

(12) United States Patent (10) Patent No.: US 12,602,405 B2
Kozak et al. (45) Date of Patent: Apr. 14, 2026

(54) CROSS-PLATFORM CONTENT MANAGEMENT

(71) Applicant: MASTERCARD INTERNATIONAL INCORPORATED, Purchase, NY (US)

(72) Inventors: Michael Kozak, Brooklyn, NY (US); Jessica Greco, Dobbs Ferry, NY (US); Kendal Sparks, New York, NY (US); Qi Zhang, Jersey City, NJ (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 18/893,121

(22) Filed: Sep. 23, 2024

(65) Prior Publication Data

US 2025/0013671 A1 Jan. 9, 2025

Related U.S. Application Data

(63) Continuation of application No. 17/990,364, filed on Nov. 18, 2022, now Pat. No. 12,099,529.

(Continued)

(51) Int. Cl.
| | |
|---|---|
| G06F 16/28 | (2019.01) |
| G06F 16/23 | (2019.01) |

(52) U.S. Cl.
CPC ........ G06F 16/289 (2019.01); G06F 16/2358 (2019.01)

(58) Field of Classification Search
CPC ................................ G06F 16/28; G06F 16/23
See application file for complete search history.

(56) References Cited

U.S. PATENT DOCUMENTS

| | | | |
|---|---|---|---|
| 9,830,319 | B1 | 11/2017 | Tortosa et al. |
| 2013/0232157 | A1 | 9/2013 | Kamel |

(Continued)

FOREIGN PATENT DOCUMENTS

| | | |
|---|---|---|
| CN | 112764943 A | 5/2021 |

OTHER PUBLICATIONS

International Search Report and Written Opinion issued in International Application No. PCT/US2023/014568, mailed Jun. 28, 2023, 9 pages.

(Continued)

*Primary Examiner* — Maher N Algibhah
(74) *Attorney, Agent, or Firm* — Talem IP Law, LLP

(57) ABSTRACT

A method of generating a content library includes receiving a generate command that indicates a design application file to generate a content library, identifying a set of primitives from the design application file, and generating a content library from the set of primitives. In some cases, the method further includes receiving an import command to import content from a file that is a same format type as the content library and in response to receiving the import command, extracting appropriate values from associated primitives in the file and importing the appropriate values to the design application file. In some cases, the method further includes receiving an export command to export content from the design application file to a different application file of a specified format type and providing the content library in the specified format type.

20 Claims, 5 Drawing Sheets

Related U.S. Application Data

(60) Provisional application No. 63/330,576, filed on Apr. 13, 2022.

(56) References Cited

U.S. PATENT DOCUMENTS

| | | |
|---|---|---|
| 2017/0357738 A1 | 12/2017 | Garske et al. |
| 2018/0113887 A1 | 4/2018 | Le et al. |
| 2018/0181413 A1 | 6/2018 | Arunyaangkul et al. |
| 2020/0117745 A1 | 4/2020 | Krishna PG et al. |
| 2020/0394152 A1 | 12/2020 | Bland et al. |
| 2021/0034339 A1* | 2/2021 | Romero ................... G06N 5/04 |
| 2021/0073322 A1 | 3/2021 | Kumawat et al. |
| 2022/0207165 A1 | 6/2022 | Pan et al. |
| 2023/0195954 A1 | 6/2023 | Fisher et al. |

OTHER PUBLICATIONS

Non-Final Office Action issued in U.S. Appl. No. 17/990,364, mailed Nov. 9, 2023, 21 pages.
Final Office Action issued in U.S. Appl. No. 17/990,364, mailed Feb. 12, 2024, 16 pages.

* cited by examiner

200

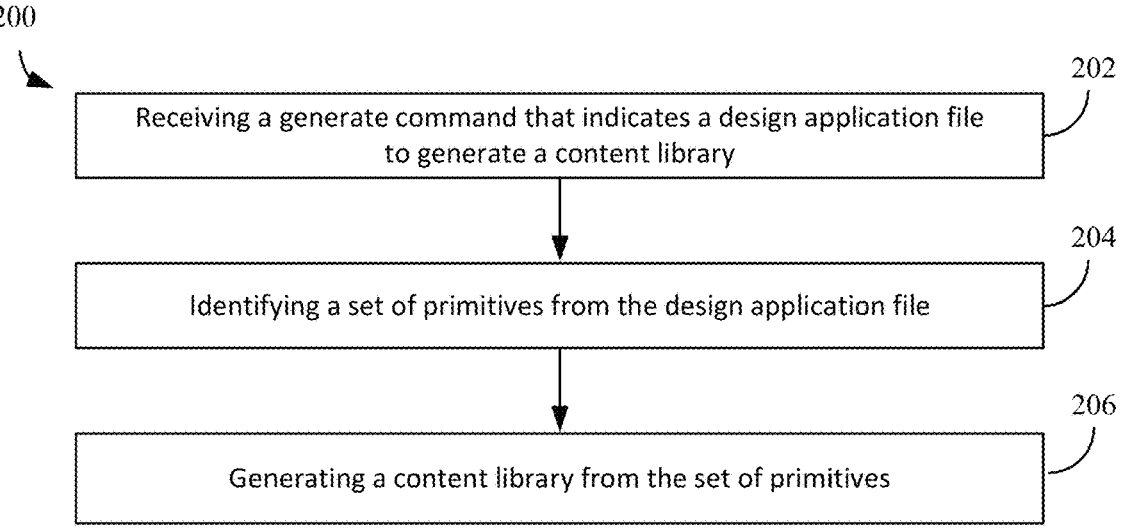

202

Receiving a generate command that indicates a design application file to generate a content library

204

Identifying a set of primitives from the design application file

206

Generating a content library from the set of primitives

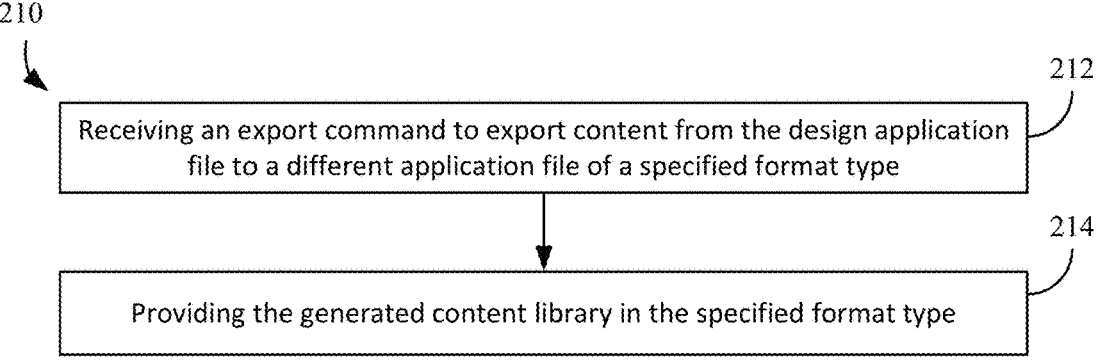

212

Receiving an export command to export content from the design application file to a different application file of a specified format type

214

Providing the generated content library in the specified format type

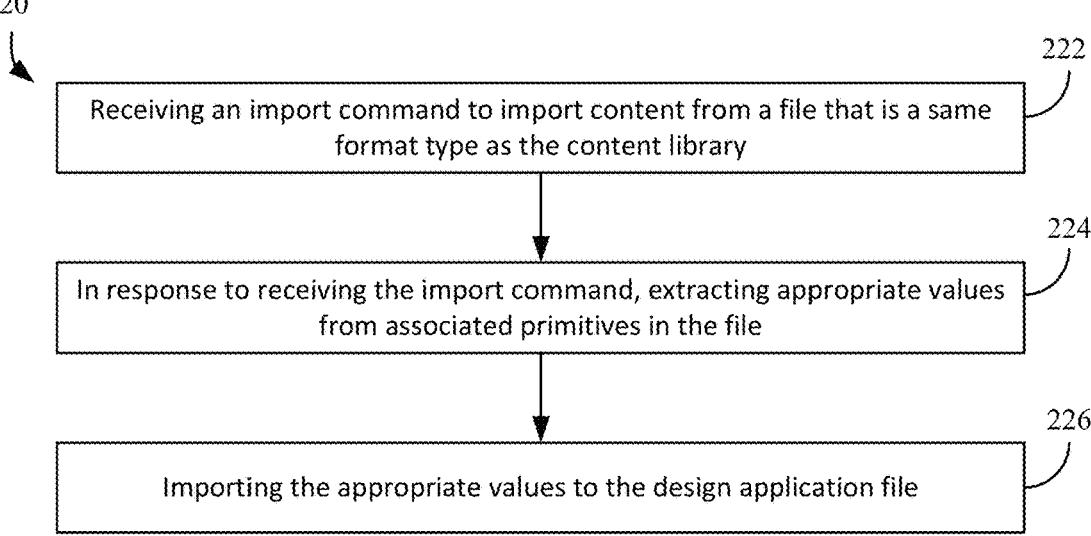

222

Receiving an import command to import content from a file that is a same format type as the content library

224

In response to receiving the import command, extracting appropriate values from associated primitives in the file

226

Importing the appropriate values to the design application file

CROSS-PLATFORM CONTENT MANAGEMENT

CROSS REFERENCE TO RELATED APPLICATION

This application claims the benefit of U.S. patent application Ser. No. 17/990,364, filed Nov. 18, 2022, which claims the benefit of U.S. Provisional Patent Application Ser. No. 63/330,576, filed Apr. 13, 2022, the entire contents of which are hereby incorporated by reference for all purposes.

BACKGROUND

Content localization and translation can quickly become a bottleneck when scaling new products and/or services to the global market. Indeed, when developing new products and/or services, a common pain point among technology companies is managing the exponential volume of content as the product and/or services are scaled across numerous languages and countries. This exponential volume of content may include managing multiple permutations of legal disclosures in the original language and translated versions, as well as localized differences in explanatory and/or legal content that need to maintain a unified core message across different languages and/or dialects. Failure to manage this content can potentially open the technology company up to legal liability.

When first developing a product and/or service, design, product, and engineering are three groups that may need to share content. However, when scaling to the global market, the groups that may need to share content include design, product, engineering, translation, regional product management, regional product marketing, regional marketing, and regional legal counsel. This level of cross-communication between groups is necessary to translate the work, ensure it is legally appropriate for the country/state in question, ensure it is on-message and grammatically correct, approved with the appropriate authorities, ensure that the content is consistent across each instance of the product and/or service, and to track and cascade changes to development and design over time. Furthermore, these groups may use different applications (e.g., with varying file types that each utilize a different file format) that best suit that group's purposes. Therefore, when a change is made by one group using one application, a corresponding change may need to be manually made by another group that uses a different application, which uses valuable employee time within that group on a change that may not be particularly important to that group's purposes. This is particularly challenging when making changes to design application files where the changes are made by groups using software applications that do not work with design application file formats.

Therefore, there is a need within these groups to develop workflow automation tools to simplify, speed up, and streamline workflows to scale successful products to the global market.

BRIEF SUMMARY

Cross-platform content management systems and methods are described herein. The cross-platform content management systems and methods described herein utilize a content library that is a single source of truth supporting automation between design files among groups working on a product and/or service. The content library can be swapped in and out of a single set of design files that are the user interface (UI) source of truth. Advantageously, the cross-platform content management systems and methods can allow for actions to be applied to the content library and then have the changes exported to appropriate outputs utilized among groups working on the product and/or service while maintaining (and potentially improving) consistency at scale, which reduces development efforts, time, money, and manually produced transcription errors.

A method of generating a content library includes receiving a generate command that indicates a design application file to generate a content library, identifying a set of primitives from the design application file, and generating a content library from the set of primitives.

In some cases, the content library is a JSON file. In some cases, the content library is a tabular data file. In some cases, the method further includes receiving an import command to import content from a file that is a same format type as the content library and in response to receiving the import command, extracting appropriate values from associated primitives in the file and importing the appropriate values to the design application file. In some cases, the method further includes receiving an export command to export content from the design application file to a different application file of a specified format type and providing the content library in the specified format type. In some cases, providing the content library includes directly providing the generated content library. In some cases, providing the content library includes converting the generated content library to a specified hierarchical or tabular format having key-value pairs. In some cases, the specified hierarchical or tabular format having the key-value pairs is CSV, TSV, or JSON.

Systems and computer-readable storage media configured to perform the method of generating the content library are also described herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 2A-2C illustrate process flows for various functionality for cross-platform content management. FIG. 2A illustrates a method of creating a content library; FIG. 2B illustrates a method of exporting content from a design file to another file type; and FIG. 2C illustrates a method of importing content from a file to a design file.

DETAILED DESCRIPTION

Figure 1:
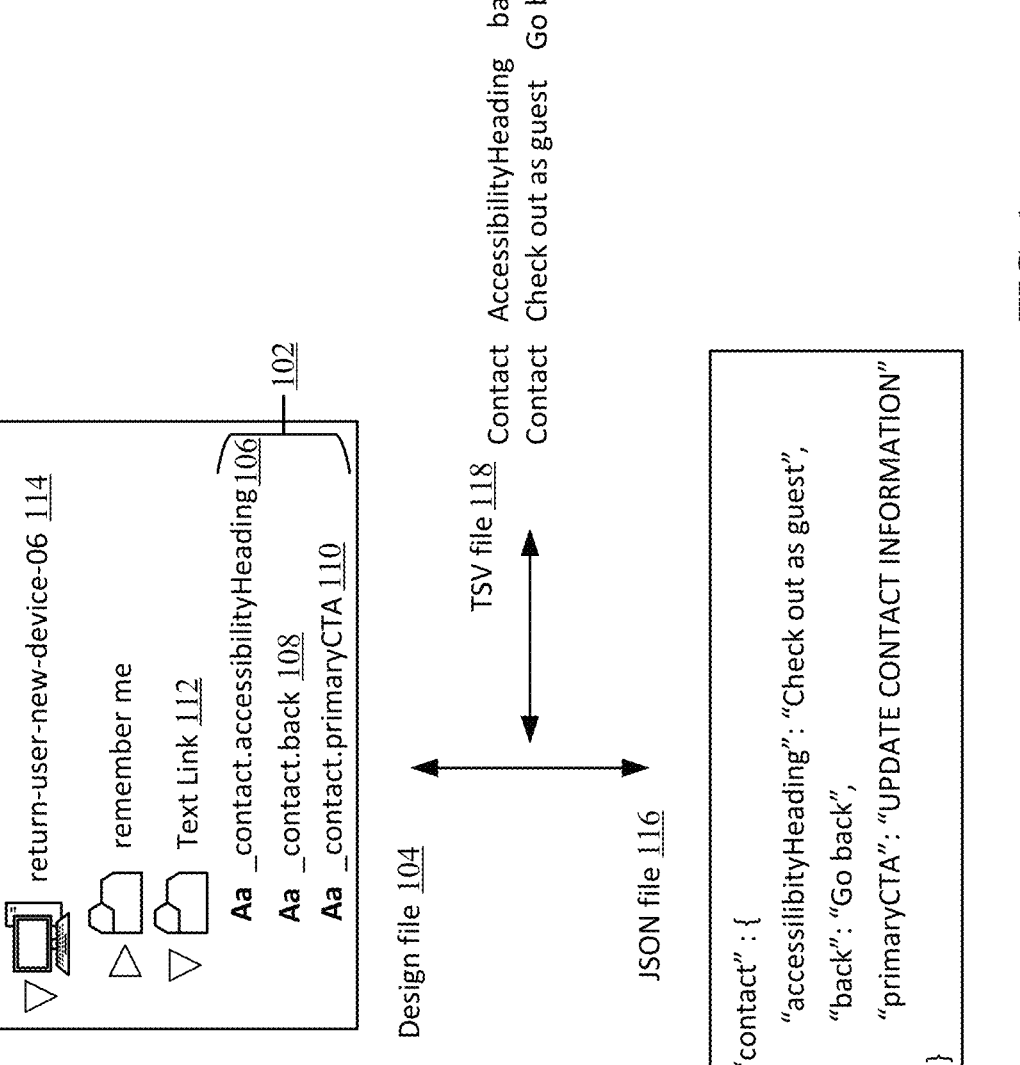
FIG. 1 illustrates example views of a design element in a design file structure, JSON format, and TSV format.

Cross-platform content management systems and methods are described herein. The cross-platform content management systems and methods described herein utilize a content library that is a single source of truth supporting automation between design files among groups working on a product and/or service. The content library can be swapped in and out of a single set of design files that are the user interface (UI) source of truth. Advantageously, the cross-platform content management systems and methods can allow for actions to be applied to the content library and then have the changes exported to appropriate outputs utilized among groups working on the product and/or service while maintaining (and potentially improving) consistency at scale, which reduces development efforts, time, money, and manually produced transcription errors.

The cross-platform content management systems and methods automates content localization and translation processes. In some cases, the cross-platform content management systems and methods may be in the form of a plugin and/or external utilities to each design application. In some cases, the external utilities can facilitate more efficient translation, automate error-checking processes, and package content for easy handoff to another group (e.g., that may be using a different design application). In some cases, a content library is an object-based single source of truth for all content strings, which provides content as a service (CaaS) to development, allowing for increased automation of the translation and localization processes.

A source of truth refers to a location storing data for a system. A single source of truth refers to the single location in which data aggregated from many systems can be found. In designing online or software products and content, design teams and developers generally maintain their own source of truth. For example, design teams may use design applications such as available from SKETCH, ADOBE, and FIGMA, which rely on a corresponding design application file as the source of truth, while developers use engineering and programming applications that may rely on JSON or other object-oriented databases as the source of truth. Aggregating these two types of data into a single source of truth can be challenging because design files involve a visual representation of features and content, are context-specific, and intentionally duplicative. JSON databases are divorced from visual context and tend to include one instance of each string, displayed repeatedly. Advantageously, the described techniques enable a single source of truth that can be used by the different groups including design teams and developers.

One aspect of creating the single source of truth is the application of a suitable naming scheme for elements in the design application. Most design software allows an end user to name elements (e.g., textual and/or visual elements) and these elements can be named in a manner that supports extraction to a format such as JSON.

Indeed, most design software allows an end user to name and organize elements (e.g., textual and/or visual elements) hierarchically, and can be further grouped and/or nested to an arbitrary depth in the hierarchal structure. The cross-platform content management systems and methods converts content from a design application file's internal hierarchal data structure (e.g., SKETCH, ADOBE XD, and FIGMA) into a format-agnostic extensible content library by recursively traversing the entire hierarchal data structure in order to identify a set of primitives for the content library and then use shallow copies of the identified set of primitives to generate a tabular format, wherein the columns represent schema key values and rows represent each primitive entry. The set of primitives identified from the traversal of the data structure are from the string/text elements in the design application file. The other primitives (e.g., the vector path, metadata, etc.) are ignored.

FIG. 1 illustrates example views of a design element in a design file structure, JSON format, and TSV format. Referring to FIG. 1, a design element 102 in a design file 104 for a contact field, which may be found in numerous places in the design, includes names for primitives of "_contact.accessibilityHeading" 106, "_contact.back" 108, and "_contact.primaryCTA" 110. These named elements 106, 108, 110, which are grouped in a hierarchical structure under "Text Link" 112 for an element under "return-user-new-device-06" 114, can be extracted for the content library and converted or viewed as the JSON file 116 and/or the TSV format file 118. Any changes made within the JSON file 116 or the TSV file 118 can be imported back into the design file 104 through processes described herein.

In some cases, entries to the content library are appended with a field containing an object pointer or reference (e.g., a naming convention) to the address of the source node within the document object in order to facilitate any write operations (e.g., import and/or export) to nodes within the source document itself. To convert to a different design application, an output file can be generated by culling and/or modifying the content library through concatenation and/or omission of certain fields in order to accommodate the intended design application. In some cases, the content library can be exported to a tabular (e.g., TSV) file which includes additional unpopulated column(s) to allow for specific data to be added and/or modified externally. The tabular file can then be imported, using the content library, back into the design software (e.g., via a plugin). In some cases, the plugin parses the entries of the tabular file and maps the entries of the tabular file back against the previous version of the content library to flag and enqueue newly added and/or modified data for subsequent update to the document object of the original design file, which saves on computationally and temporally expensive future recursive traversals of the entire hierarchal data structure and limits the number of read, write, and traversal operations that need to be performed against the source document object itself.

In some cases, the content library uses namespacing to maintain a many-to-many connection between individual design source file elements and individual object keys that represent the content/hierarchal structure currently deployed in that design application. This results in a stand-alone source of truth for content that does not need to be exported into a tabular format in order to import changes to other design applications. If something in that design application's design files (e.g., a text label) or source code (e.g., an object key) has changed, the cross-platform content management systems and methods checks and updates the namespace connection, reducing manual maintenance and allowing that group's employees to focus their efforts on value creation. Indeed, the cross-platform content management systems and methods allow a user to multidimensionally map an arbitrary number of content/hierarchal structures (e.g., representing different design applications) to one another, which allows the content in those content/hierarchal structures to be maintained in a format-agnostic manner.

The cross-platform content management systems and methods further allows the user to generate a timestamped benchmark capturing the current state of the content library. That timestamped benchmark includes a set of object keys. Using the object keys, the content library that is created spans all parts of the design application. The creation of the content library allows for the input, output, and query operations described herein to be run primarily against the content library which saves on computationally and temporally expensive future recursive traversals of the entire hierarchal data structure and limits the number of read, write, and traversal operations that need to be performed against the source document object itself.

To update the content library, a change process is run from the content library and uses the timestamped benchmark as a point of reference for mapping and key changes as well as to automate updates. For example, during the change process, the system can note that keys have changed but the string remains the same and make updates accordingly. This functionality removes the need for manual updates to each design application used by the various groups while also promoting interoperability of content.

In some cases, an override option is provided for the content library namespace that prevents automatic mapping. For example, a one-off prototype may utilize a specific change that should not be shared across the various groups. This override option provides the ability to store both options without impacting the delivery-to-development process. Advantageously, the content library namespace can be utilized for many to zero or many to one structure for one-off cases, with a proxy string in use for those cases. For example, the cross-platform content management systems and methods is capable of identifying (e.g., via identifiers/ namespacing) which key and associated content string is mapped to the development group and not the one-off case. This allows for namespace isolation and retains extra strings for other uses (e.g., prototypes, testing, etc.) that the development group does not need.

Advantageously, maintaining the content in a format-agnostic manner allows for easy reconnection to the user interface that originated it, providing enhanced visual context to ensure the content voice and tone remains consistent across translations. The speed and ease of content transference from the source of truth into various containers also empowers regional product and legal groups to ensure messaging is accurate and legal risk is minimized before the product and/or service is released into new countries and/or languages. Furthermore, maintaining content in a content library that is separate from numerous design source files and from live code is a best practice to ensure content is consistent across all groups and promotes transparency to all reviewers who are responsible for its accuracy.

FIGS. 2A-2C illustrate process flows for various functionality for cross-platform content management. The functionality can be implemented by a computing device (e.g., computing device 500 described with respect to FIG. 5) executing instructions. The functionality can be initiated through commands made available in a menu of a graphical user interface of a design application. These commands may be in-built or supported by a plugin for the design application. For example, Bohemian Coding's SKETCH application offers an interface to extend the core functionality of the software, through its plugin architecture. A plugin for SKETCH may be written in Cocoascript (a language that allows developers to use Cocoa and Objective-C functions through JavaScript). A plugin refers to a software component that adds a specific feature to an existing computer program.

FIG. 2A illustrates a method of creating a content library. Referring to FIG. 2A, a method 200 of creating a content library includes receiving (202) a generate command to generate a content library. The generate command indicates a design application file that is to be used to generate a content library. The method 200 further includes identifying (204) a set of primitives from the design application file and generating (206) a content library from the set of primitives.

As explained above with respect to FIG. 1, a design file can be developed using a suitable naming scheme (e.g., a namespacing convention) for the textual elements. The naming scheme provides an element name which is then paired with a value, which may be string. When the generate command is received (202), the system can identify (204) the set of primitives from the design file by traversing the design file (e.g., while focusing on the textual elements in the design file). The design file may have a complex hierarchical data structure such that a recursive traversing process is used to ensure the entire file is traversed. The naming scheme can follow the conventions of object-based addressing (e.g., delimited hierarchical concatenation) to convey arbitrary organizational or structural hierarchy. It is further possible to use a naming scheme that follows a specified formatting convention (e.g., leading underscore character) which is used to indicate the set of primitives in the content library. The content library may be in the form of a look up table or stored in any suitable format for the object-based notation. In some cases, the generated content library is stored as a JSON file. In some cases, the generated content library is stored as a tabular data file (e.g., TSV).

Advantageously, by generating a content library from the identified primitives, it is possible to significantly reduce the number of entries in the design file, which reduces the number of distinct elements that may need to be translated or otherwise acted upon. For example, if a text string appears in the design file one hundred times, that text string can be represented by a single namespace in the content library (e.g., JSON file or tabular data file) so that a change to a single instance of the text string can be easily duplicated to the other ninety-nine instances of that text string in the design file.

The generated content library can be used as the single source of truth and exported to any of a variety of applications. For example, FIG. 2B illustrates a method of exporting content from a design file to another file type.

Referring to FIG. 2B, a method 210 of exporting content from a design file to another file type includes receiving (212) an export command to export content from the design application file to a different application file of a specified format type and providing (214) the content library in the specified format type. In some cases, providing (214) the content library includes directly providing the generated content library. In some cases, providing (214) the content library includes converting the generated content library to a specified hierarchical or tabular format having key-value pairs and providing the file in the specified hierarchical or tabular format. In some cases, the specified hierarchical or tabular format having the key-value pairs is CSV, TSV, or JSON.

The exported file can be used by various groups to perform their tasks. Any modifications to the content can be made using an appropriate application with editing functionality for the file format of the file. For example, the exported file can be sent for translations. The translated text can then be imported back in to a design file. For example, FIG. 2C illustrates a method of importing content from a file to a design file. Referring to FIG. 2C, a method 220 of importing content from a file to a design file includes receiving (222) an import command to import content from a file. The file can be a tabular data file or other file that uses the object-based format of the content library. In response to receiving the import command, the method 220 can include extracting (224) appropriate values from associated primitives in the file and importing (226) the appropriate values to the design application file.

In an illustrative example, extracting (224) appropriate values from associated primitives in the file and importing (226) the appropriate values to the design application file can include identifying changes in values between the content library and the file by parsing entries of the file for primitives and mapping the primitives to the content library; flagging entries of the file identified as having a change in value, the flagged entries indicating the appropriate values from the associated primitives; and enqueuing the flagged entries for updating the design application file with the appropriate values.

In some cases, when generating a content library, exporting content, or importing content, methods can further include validating the content library via an automated quality assurance process that detects mismatches or incongruities between the design application file and the content library based on key-value pairs assigned in the content library. In some cases, validating the content library includes validation within and across strings, checking for content, grammar, typos, line breaks, and invalid characters. In some cases, validating the content library is performed in conjunction with import and/or export commands.

Figure 3:
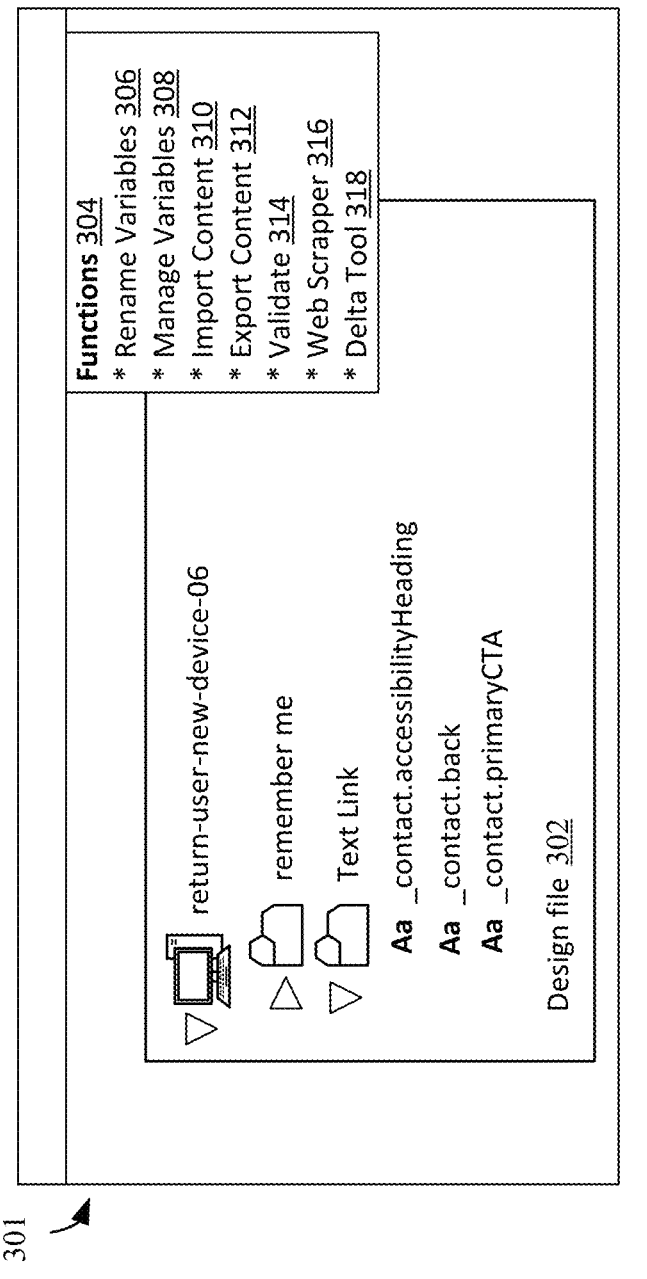
FIG. 3 illustrates an example view of a function menu in a design file structure.

FIG. 3 illustrates an example view of a function menu in a graphical user interface of a design file structure. Referring to FIG. 3, a graphical user interface 301 of a design file 302 can include a functions menu 304. In some cases, one or more functions of the functions menu 304 may be implemented as a plug-in. In some cases, one or more functions of the functions menu 304 may be implemented in other file types (e.g., SKETCH, JSON, CSV, TSV). The functions menu 304 may include a Rename Variables function 306 that allows the user to export and import text elements to a tabular data file for external editing, a Manage Variables function 308 that allows the user to allocate variables from external JSON files, an Import Content function 310 (which may follow method 220) that allows translated content to be imported back into the SKETCH source file from any tabular format (e.g., CSV, TSV, JSON) which makes it possible to maintain a single set of SKETCH source files (which in turn reduces design effort exponentially), an Export Content function 312 (which may follow method 210) that allows the export of source content into any tabular format which allows the finalized content to be easily reformatted and sent to another group in a format that is compatible with their design application without compromising the availability of other design applications during the editing process, a Validate 314 function that provides an automated process that detects mismatches or incongruities between design files and the live development instance based on the JSON key to value pairs. In some cases, these functions are implemented as a plugin.

In some cases, the Validate function 314 includes validation within and across strings, checking for content, grammar, typos, line breaks, and invalid characters. This functionality removes the need to manually check designs each time a change is made and can identify if something in another group (e.g., production) has changed such that it would impact the design and content workflows, reducing the amount of manual work exponentially across the multiple source files needed for each country and language.

For the Export Content function 312, the source content can be a SKETCH file. The export of source content into a tabular format can exclude any duplicative instances of the same content as well as ignore (e.g., not export) any annotations, flow descriptions, or other text elements that are not a part of the actual user interface. Therefore, when the tabular format of the source content is returned from translation (e.g., via the Import Content function 310), the tabular format can be imported directly into a design application (e.g., SKETCH), allowing for replacement of all source/text content with translated content in a single step. By allowing for replacement of all source/text content with translated content in a single step, at-a-glance checking of the translated content for accidental exclusions and the ability to identify any needed revisions when translations do not fit into containers is provided. In some cases, error checking can be automated via a comprehensive set of automated quality assurance tools before distribution to another group. For example, the automated quality assurance tools may include, but are not limited to, validating content uniformity (e.g., checking across multiple instances of particular text string for grammatical errors such as punctuation/spelling) and verifying structural compatibility with content schemata currently live in another group. Additionally, due to the ability to convert from a design application file into a format-agnostic content library, a single set of employees can be responsible for an additional layer of error-checking for all groups, if desired.

In some cases, the functions menu 304 further includes a Web Scrapper function 316 that retrieves and aggregates all content from specified design application repositories and searches for gaps in translated content and/or a Delta Tool function 318 that utilizes the outputs of the Export 312 or Import functions 310 and the Web Scrapper function 316 and generates a content library and a quality assurance output, converts the content library and the quality assurance output into a two-dimensional array, compares each dimension against one another, maps keys to keys based on string similarities, and highlights anything that appears invalid. In some cases, the two-dimensional array can be used to identify differences between two timestamped versions to identify changes over time so that mapping changes can be addressed. In some cases, the Delta Tool function 318 further generates a proxy map to encapsulate the full set of content and associated keys at a specific point in time. In some cases, the Web Scrapper and/or the Delta Tool function 316, 318 are implemented as an external utility.

Figure 4:
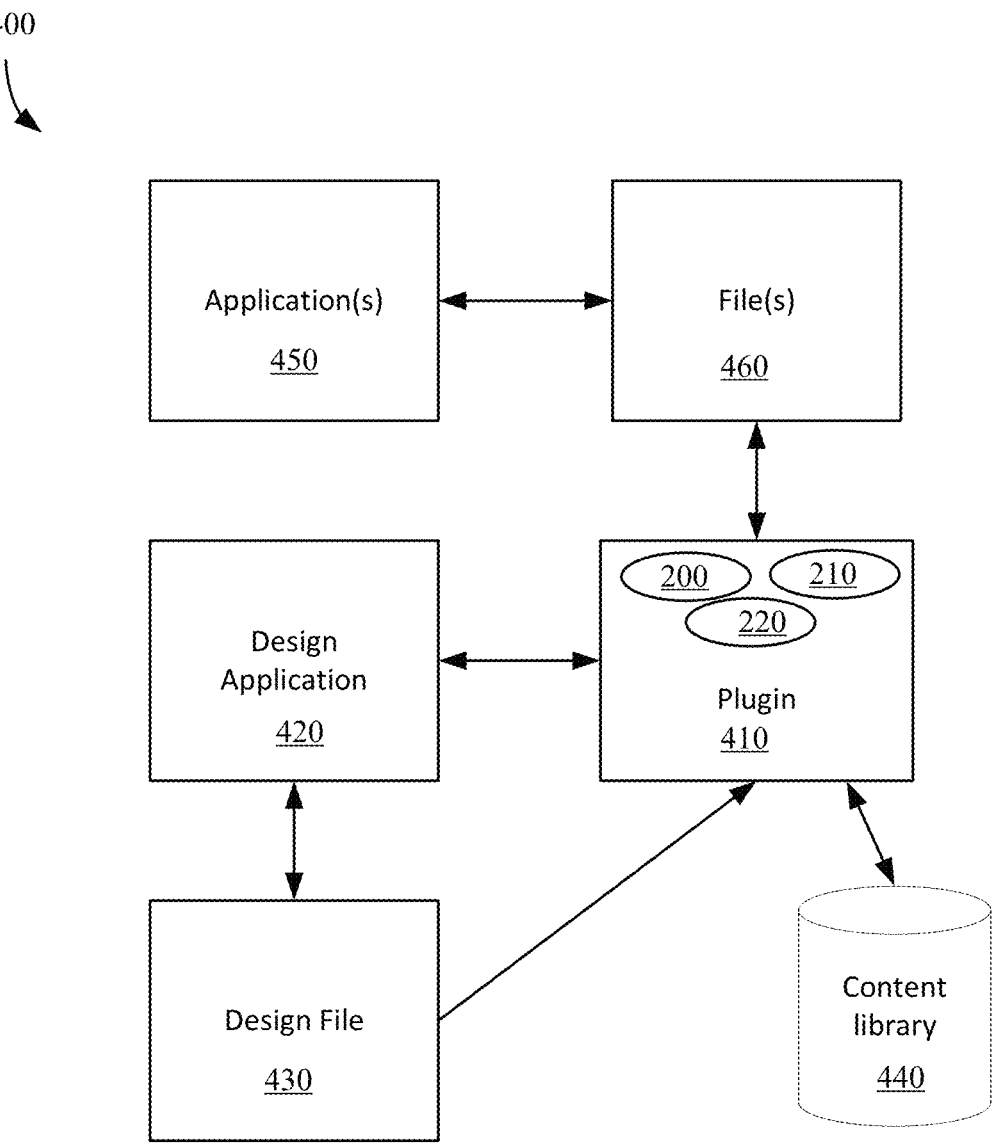
FIG. 4 illustrates an example operating environment of a plugin supporting cross-platform content management.

FIG. 4 illustrates an example operating environment of a plugin supporting cross-platform content management. The operating environment 400 can include a plugin 410, which can include the functionality described above, including, but not limited to, generation of content library method 200, export method 210, and import method 220 as described with respect to FIGS. 2A-2C, a design application 420, a design file 430, a content library resource 440, an application 450, and a file 460 of, for example, a tabular file format.

Figure 5:
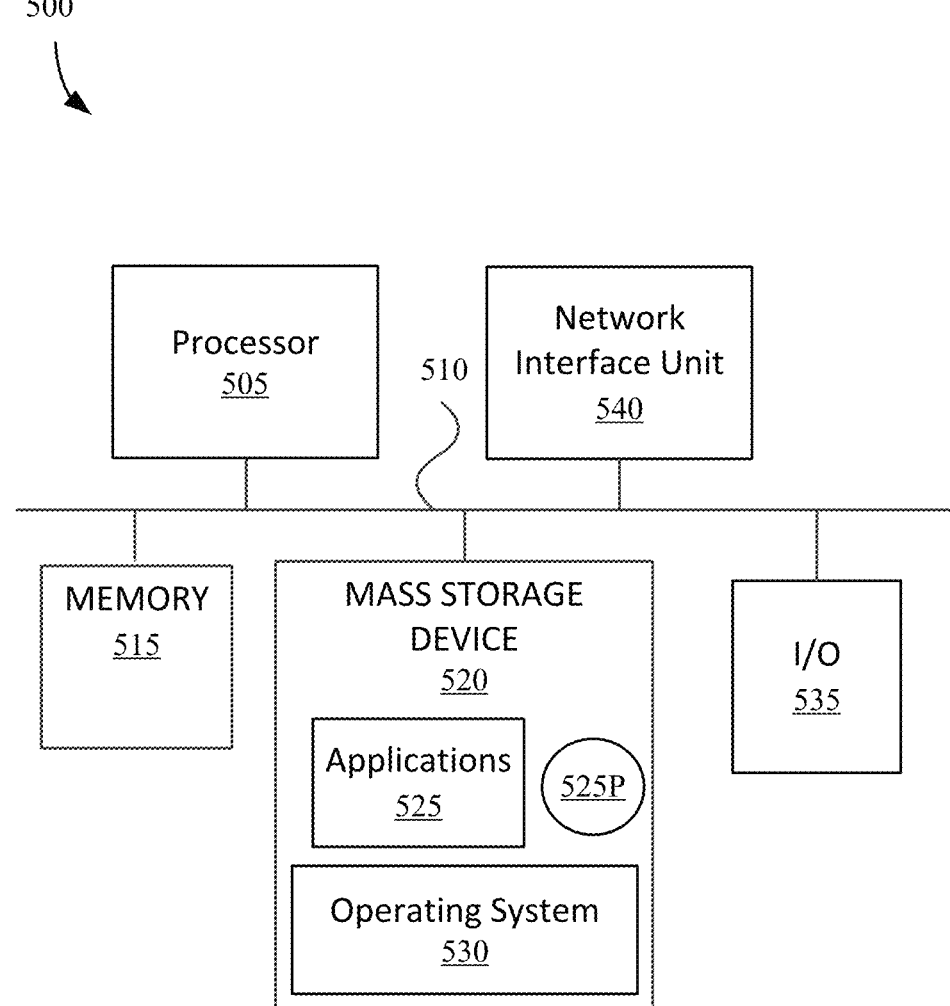
FIG. 5 illustrates a block diagram illustrating components of a computing device used in some embodiments.

Elements of operating environment 400 may be embodied on one or more computing devices implemented such as device 500 described with respect to FIG. 5. Files 430, 460 may be stored locally on the computing device or may be accessible via a network interface of the computing device. The files 430, 460 may be stored separately.

The design file 430 may be interpreted by the design application 420 and rendered on a canvas interface of the design application 420 for consumption and editing by a user within the design application 420.

Communication between the plugin 410 and the design application 420 may be carried out as well known for plugins. The plugin 410 can execute from within the design application 420 and initiate the methods 200, 210, 220 in response to commands. For example, the design file 430 can be exported to the file format of file 460 via method 210 of the plugin 410. The file format of the file 460 may be, for example, a meta-language file format (e.g., JSON) or a tabular data file format (e.g., TSV, CSV).

File 460 may be interpreted by the application 450 and rendered on a canvas interface of the application 450 for consumption and editing by a user within the application 450. Modifications to the content of the file 460 can be made via the application 450. Application 450 may be any of a plurality of different applications including, but not limited to, an application used by language translation services and an application that can handle a production content file. It should be understood that while only one application 450 and file 460 are shown, these are available in plurality in the operating environment 400 at the same or at different times. For example, many different types of files may be exported; and, in some cases, more than one file may be produced at a time. That is, the design file 430 can be exported to the file format of one or more files via method 210 of the plugin 410 and when multiple files are output these files may be in the same file format or in different file formats suitable for corresponding applications.

Updates to the content of the file 460 can be imported back to the design application file 430 via the import method 220 of the plugin 410. For example, a user may select, while in the design application 420 to import changes or changes may be automatically imported at predetermined times.

FIG. 5 illustrates a block diagram illustrating components of a computing device used in some embodiments. It should be understood that aspects of the system described herein are applicable to both mobile and traditional desktop computers, as well as server computers and other computer systems. Components of computing device 500 may represent a personal computer, a reader, a mobile device, a personal digital assistant, a wearable computer, a smart phone, a tablet, a laptop computer (notebook or netbook), a gaming device or console, an entertainment device, a hybrid computer, a desktop computer, a smart television, or an electronic whiteboard or large form-factor touchscreen as some examples. Accordingly, more or fewer elements described with respect to computing device 500 may be incorporated to implement a particular computing device.

Referring to FIG. 5, a computing device 500 can include at least one processor 505 connected to components via a system bus 510; a system memory 515 and a mass storage device 520. A processor 505 processes data according to instructions of one or more application programs 525, and/or operating system 530. Examples of processor 505 include general purpose central processing units (CPUs), graphics processing units (GPUs), field programmable gate arrays (FPGAs), application specific processors, and logic devices, as well as any other type of processing device, combinations, or variations thereof. Processor 505 may be, or is included in, a system-on-chip (SoC) along with one or more other components such as sensors (e.g., magnetometer, an ambient light sensor, a proximity sensor, an accelerometer, a gyroscope, a Global Positioning System sensor, temperature sensor, shock sensor) and network connectivity components (e.g., including network interface 540).

The one or more application programs 525 may be loaded into the mass storage device 520 and run on or in association with the operating system 530. Examples of application programs 525 include design applications such as SKETCH or JSON and other applications which may be used to view and edit various content. Instructions 525P for the plugin described herein can also be stored on the mass storage device 520. Other application programs may be loaded into the mass storage device 520 and run on the device, including various client and server applications. Files, including design files, tabular files, JSON files, etc. may be stored on the mass storage device 520 or may be accessible via the network interface unit 540. Similarly, a content library as described herein may be stored on the mass storage device 520 or may be accessible via the network interface unit 540.

It can be understood that the mass storage device 520 may involve one or more memory components including integrated and removable memory components and that one or more of the memory components can store an operating system. Examples of mass storage device 520 include removable and non-removable storage media including random access memory, read only memory, magnetic disks, optical disks, CDs, DVDs, flash memory, magnetic cassettes, magnetic tape, magnetic disk storage or other magnetic storage devices, or any other suitable storage media. Mass storage device 520 does not consist of propagating signals or carrier waves.

The system memory 515 may include a random-access memory ("RAM") and/or a read-only memory ("ROM"). The RAM generally provides a local storage and/or cache during processor operations and the ROM generally stores the basic routines that help to transfer information between elements within the computer architecture such as during startup.

A synchronization application may also be included and reside as part of the application programs 525 for interacting with a corresponding synchronization application on a host computer system (such as a server) to keep the information stored in a non-volatile storage (such as of mass storage device 520) synchronized with corresponding information stored at the host computer system.

The system can further include user interface system 535, which may include input/output (I/O) devices and components that enable communication between a user and the computing device 500. User interface system 535 can include one or more input devices such as, but not limited to, a mouse, track pad, keyboard, a touch device for receiving a touch gesture from a user, a motion input device for detecting non-touch gestures and other motions by a user, a microphone for detecting speech, and other types of input devices and their associated processing elements capable of receiving user input.

The user interface system 535 may also include one or more output devices such as, but not limited to, display screen(s), speakers, haptic devices for tactile feedback, and other types of output devices. In certain cases, the input and output devices may be combined in a single device, such as a touchscreen display which both depicts images and receives touch gesture input from the user.

The network interface 540 allows the system to communicate with other computing devices, including server computing devices and other client devices, over a network. The network interface 540 can include a unit to perform the function of transmitting and receiving radio frequency communications to facilitate wireless connectivity between the system and the "outside world," via a communications carrier or service provider. Transmissions to and from the network interface 540 are conducted under control of the operating system 530, which disseminates communications received by the network interface 540 to application programs 525 and vice versa.

In various implementations, data/information stored via the system may include data caches stored locally on the device or the data may be stored on any number of storage media that may be accessed by the device via the network interface 540 or via a wired connection between the device and a separate computing device associated with the device, for example, a server computer in a distributed computing network, such as the Internet. As should be appreciated such data/information may be accessed through the device via the network interface 540 or a distributed computing network. Similarly, such data/information may be readily transferred between computing devices for storage and use according to well-known data/information transfer and storage means, including electronic mail and collaborative data/information sharing systems.

Certain techniques set forth herein may be described in the general context of computer-executable instructions, such as program modules, executed by one or more computing devices. Generally, program modules include routines, programs, objects, components, and data structures that perform particular tasks or implement particular abstract data types.

Embodiments may be implemented as a computer process, a computing system, or as an article of manufacture, such as a computer program product or computer-readable medium. Certain methods and processes described herein can be embodied as code and/or data, which may be stored on one or more computer-readable media. Certain embodiments of the invention contemplate the use of a machine in the form of a computer system within which a set of instructions, when executed, can cause the system to perform any one or more of the methodologies discussed above. Certain computer program products may be one or more computer-readable storage media readable by a computer system and encoding a computer program of instructions for executing a computer process.

It should be understood that as used herein, in no case do the terms "storage media," "computer-readable storage media" or "computer-readable storage medium" consist of transitory carrier waves or propagating signals. Instead, "storage" media refers to non-transitory media.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method comprising:

receiving a generate command to generate a content library, the generate command indicating a design application file having text elements and visual elements;

identifying a set of primitives from the design application file, the primitives comprising the text elements;

generating a content library from the set of primitives identified from the design application file;

applying namespacing to the primitives comprising the text elements including to a specific text element having a plurality of instances, wherein the content library uses the namespacing to maintain a many-to-many connection of the primitives comprising the text elements of the design application;

receiving an update to the design application file that includes a change to a particular instance of the specific text element;

checking a namespace connection of the particular instance of the specific text element; and updating remaining instances of the plurality of instances of the specific text element.

2. The method of claim 1, wherein the content library is a JSON file.

3. The method of claim 1, wherein the content library is a tabular data file.

4. The method of claim 1, further comprising:

receiving an export command to export content from the design application file to a different application file of a specified format type; and providing the content library in the specified format type.

5. The method of claim 4, wherein providing the content library comprises directly providing the generated content library.

6. The method of claim 4, wherein providing the content library comprises converting the generated content library to a specified hierarchical or tabular format having key-value pairs.

7. The method of claim 6, wherein the specified hierarchical or tabular format having the key-value pairs is CSV, TSV, or JSON.

8. The method of claim 4, further comprising validating the content library via an automated process that detects mismatches or incongruities between the design application file and the content library based on key-value pairs.

9. One or more computer-readable storage media having instructions stored thereon that when executed by a computing device, direct the computing device to at least:

receive a generate command to generate a content library, the generate command indicating a design application file having text elements and visual elements;

identify a set of primitives from the design application file, the primitives comprising text elements;

generate a content library from the set of primitives identified from the design application file;

apply namespacing to the primitives comprising the text elements including to a specific text element having a plurality of instances, wherein the content library uses the namespacing to maintain a many-to-many connection between the primitives comprising the text elements of the design application;

receive an update to the design application file that includes a change to a particular instance of the specific text element;

check a namespace connection of the particular instance of the specific text element; and update remaining instances of the plurality of instances of the specific text element.

10. The media of claim 9, further comprising instructions that direct the computing device to validate the content library via an automated process that detects mismatches or incongruities between the design application file and the content library based on key-value pairs.

11. The media of claim 9, further comprising instructions that direct the computing device to:

receive an export command to export content from the design application file to a different application file of a specified format type; and provide the content library in the specified format type.

12. The media of claim 11, wherein the instructions that direct the computing device to provide the content library comprise instructions to directly provide the content library.

13. The media of claim 11, wherein the instructions that direct the computing device to provide the content library comprise instructions to convert the generated content library to a specified hierarchal or tabular format having key-value pairs.

14. The media of claim 13, wherein the specified hierarchical or tabular format having the key-value pairs is CSV, TSV, or JSON.

15. The media of claim 9, wherein the content library is a JSON file.

16. The media of claim 9, wherein the content library is a tabular data file.

17. A computing device, comprising:

a processor;

a storage medium; and instructions for cross-platform content management stored on the storage medium that when executed by the processor, direct the computing device to:

receive a generate command to generate a content library, the generate command indicating a design application file having text elements and visual elements;

identify a set of primitives from the design application file, the primitives comprising text elements;

generate a content library from the set of primitives identified from the design application file;

apply namespacing to the primitives comprising the text elements including to a specific text element having a plurality of instances, wherein the content library uses the namespacing to maintain a many-to-many connection between the primitives comprising the text elements of the design application;

receive an update to the design application file that includes a change to a particular instance of the specific text element;

check a namespace connection of the particular instance of the specific text element and update remaining instances of the plurality of instances of the specific text element.

18. The computing device of claim 17, further comprising instructions that direct the computing device to validate the content library via an automated process that detects mismatches or incongruities between the design application file and the content library based on key-value pairs.

19. The computing device of claim 17, further comprising instructions that direct the computing device to:

receive an export command to export content from the design application file to a different application file of a specified format type; and provide the content library in the specified format type.

20. The computing device of claim 17, wherein the instructions that direct the computing device to provide the content library comprise instructions to convert the generated content library to a specified hierarchal or tabular format having key-value pairs, wherein the specified hierarchal or tabular format having the key-value pairs is CSV, TSV, or JSON.

* * * * *